United States Patent
Al-Mahrous (10) Patent No.: US 10,744,543 B2
(45) Date of Patent: Aug. 18, 2020

(54) APPARATUS AND METHOD FOR IN-SITU CATHODIC PROTECTION OF PIGGABLE WATER PIPELINES

(71) Applicant: Saudi Arabian Oil Company, Dhahran (SA)

(72) Inventor: Husain Makki Al-Mahrous, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 274 days.

(21) Appl. No.: 15/815,242

(22) Filed: Nov. 16, 2017

(65) Prior Publication Data

US 2019/0143383 A1 May 16, 2019

(51) Int. Cl.
| | |
|---|---|
| *B08B 9/00* | (2006.01) |
| *B08B 9/053* | (2006.01) |
| *C23F 13/02* | (2006.01) |
| *B05D 7/22* | (2006.01) |
| *B08B 9/055* | (2006.01) |

(Continued)

(52) U.S. Cl.
CPC ............... *B08B 9/053* (2013.01); *B05C 7/08* (2013.01); *B05D 7/222* (2013.01); *B08B 9/02* (2013.01); *B08B 9/04* (2013.01); *B08B 9/055* (2013.01); *B08B 9/0557* (2013.01); *C23F 13/02* (2013.01); *C25D 5/04* (2013.01); *C25D 17/12* (2013.01); *F16L 55/38* (2013.01); *H05K 999/99* (2013.01); *B05D 3/12* (2013.01); *B05D 3/14* (2013.01); *F16L 58/02* (2013.01); *F16L 2101/12* (2013.01)

(58) Field of Classification Search
CPC ................ B08B 9/00; B08B 9/02; B08B 9/04
See application file for complete search history.

(56) References Cited

U.S. PATENT DOCUMENTS 1,805,215 A * 5/1931 Hammond ............. C25D 13/14
204/625
3,081,251 A 3/1963 Spector
(Continued)

FOREIGN PATENT DOCUMENTS

| DE | 4306618 A1 | 9/1994 |
|---|---|---|
| GB | 2261486 A | 5/1993 |

(Continued)

OTHER PUBLICATIONS

International Search Report and Written Opinion for International PCT application PCT/US2018/061515 dated Feb. 21, 2019; pp. 1-17.

*Primary Examiner* — Michael D Jennings
(74) *Attorney, Agent, or Firm* — Bracewell LLP; Constance G. Rhebergen; Vivek P. Shankam (57) ABSTRACT

Apparatus and method for cleaning the inner surface of a pipeline from deposits and for forming a protective coating are disclosed. The apparatus includes a cleaning tool which is caused to move in the interior of the pipeline by a flow of a fluid, the cleaning tool comprising a plurality of guide discs engaging the pipeline surface and mounted along a longitudinal axis of the cleaning tool, an anode positioned inside the cleaning tool, and an impressed current source electrically connected to the anode and the interior of the pipeline, the interior of the pipeline acting as a cathode when current is applied from the current source so that ions flow from the anode, through the fluid, to the interior of the pipeline.

9 Claims, 5 Drawing Sheets

(51) Int. Cl.
*C25D 5/04* (2006.01)
*C25D 17/12* (2006.01)
*B05C 7/08* (2006.01)
*F16L 55/38* (2006.01)
*B08B 9/02* (2006.01)
*B08B 9/04* (2006.01)
*F16L 58/02* (2006.01)
*F16L 101/12* (2006.01)
*B05D 3/12* (2006.01)
*B05D 3/14* (2006.01)

(56) References Cited

U.S. PATENT DOCUMENTS

| | | | |
|---|---|---|---|
| 3,978,309 A | 8/1976 | Strobach | |
| 4,017,714 A | 4/1977 | Kreiser | |
| 4,060,472 A | 11/1977 | Alewitz | |
| 4,093,529 A | 6/1978 | Strobach | |
| 4,136,001 A | 1/1979 | Nozaki | |
| 4,231,852 A | 11/1980 | Ruckert | |
| 4,306,189 A * | 12/1981 | Nozaki | C23F 13/22 324/425 |
| 4,486,288 A | 12/1984 | Lilnder | |
| 4,614,574 A | 9/1986 | Bussell | |
| 4,773,977 A | 9/1988 | Houle et al. | |
| 4,830,724 A | 5/1989 | Houle | |
| 4,891,115 A * | 1/1990 | Shishkin | B08B 9/0553 134/166 C |
| 4,910,865 A | 3/1990 | Houle | |
| 4,954,172 A | 9/1990 | Houle et al. | |
| 4,954,233 A | 9/1990 | Houle et al. | |
| 4,972,066 A | 11/1990 | Houle et al. | |
| 5,023,928 A | 6/1991 | Houle et al. | |
| 5,176,807 A | 1/1993 | Kumar | |
| 5,215,781 A | 6/1993 | Lowther | |
| 5,256,267 A | 10/1993 | Roden | |
| 5,316,641 A | 5/1994 | Wright et al. | |
| 5,334,299 A | 8/1994 | Roden | |
| 5,411,646 A | 5/1995 | Gossett et al. | |
| 6,606,452 B1 | 8/2003 | Caine | |
| 6,903,540 B2 | 6/2005 | Kean et al. | |
| 7,017,251 B1 | 3/2006 | Murphy | |
| 7,372,005 B2 | 5/2008 | Knoeppel et al. | |
| 7,387,713 B2 | 6/2008 | Marcelino et al. | |
| 7,499,525 B2 | 3/2009 | Horndler et al. | |
| 7,507,319 B2 | 3/2009 | Kuriyama et al. | |
| 7,527,714 B2 | 5/2009 | Kahite et al. | |
| 7,857,949 B2 | 12/2010 | Closset et al. | |
| 7,857,950 B1 | 12/2010 | North | |
| 2014/0262825 A1 | 9/2014 | Al-Mahrous et al. | |
| 2016/0108545 A1 * | 4/2016 | Adkisson | C25D 13/22 205/83 |
| 2016/0215920 A1 | 7/2016 | Mogensen et al. | |

FOREIGN PATENT DOCUMENTS

| | | |
|---|---|---|
| JP | 5687678 A | 7/1981 |
| JP | 2807754 B2 | 10/1998 |
| JP | 11156272 A | 6/1999 |
| JP | 3015422 B2 | 3/2000 |
| JP | 3685594 B2 | 8/2005 |

* cited by examiner

APPARATUS AND METHOD FOR IN-SITU CATHODIC PROTECTION OF PIGGABLE WATER PIPELINES

TECHNICAL FIELD

Embodiments relate generally to a pipeline pig equipped with a cathodic protection system. In particular, embodiments relate to a pipeline pig including a cathodic protection system for depositing a cathode layer on the interior of the pipeline.

BACKGROUND

An instrument for inspecting, cleaning, and maintaining a pipeline is often referred to as a pipeline pig. In some applications, the pipeline pig is propelled along an interior of the pipeline under the pressure of a pipeline fluid flowing through the pipeline. To facilitate advancement of the pipeline pig, one or more flexible guide discs or cups are often provided that extend outwardly from a longitudinal body of the pipeline pig. The flexible guide discs extend to an interior wall of the pipeline so as to form a seal between the pipeline and the pipeline pig. If the seal is substantially complete, the pipeline pig is induced to travel at the speed of the pipeline fluid. In some applications, flow channels are provided through the pipeline pig to permit a portion of the pipeline fluid to flow through the pipeline pig, thereby regulating the speed of the pipeline pig.

Buildup of scale, mil, debris, mud, sand, rust, chemicals or the like within the pipeline can be problematic for the operation of the pipeline pig. Debris ahead of the pig may slow the pipeline pig below a minimum speed required for carrying out the desired application, or in some instances, can completely prevent the pipeline pig from moving forward through the pipeline. Also, flow channels for regulating a speed of the pipeline pig reduce the maximum fluid force that can be applied to the pipeline pig to drive it through the pipeline, and thus can increase the likelihood that the pipeline pig will become stuck in the pipeline when debris or other obstructions are encountered. If the pipeline pig becomes stuck in the pipeline, flow of the pipeline fluid can be restricted or impeded. Often, contingency plans to recover the pipeline pig include cutting the pipeline at the point where the pig is stuck in order to remove it. Once the pig is removed, the pipeline is then reconnected and put back in service. This contingency plan is costly due to inhibited pipeline flow and downtime while the pipeline is cleared.

Therefore there is a need for advanced systems and methods for efficiently cleaning the pipeline and keeping the pipeline clean, debris-free, and corrosion-free for longer periods of time.

SUMMARY

One example embodiment is an apparatus for cleaning the inner surface of a pipeline from deposits and for forming a protective coating thereon. The apparatus includes a cleaning tool which is caused to move in the interior of the pipeline by a flow of a fluid, the cleaning tool including a plurality of guide discs engaging the pipeline surface and mounted along a longitudinal axis of the cleaning tool, an anode positioned inside the cleaning tool, and an impressed current source electrically connected to the anode and the interior of the pipeline, the interior of the pipeline acting as a cathode when current is applied from the current source so that ions flow from the anode, through the fluid, to the interior of the pipeline. The impressed current source may include a battery mounted on the cleaning tool. The anode may include a material selected from a group consisting of mixed metal oxide ("MMO"), platinized niobium ("PtNb") and platinized titanium ("PtTi"). The cleaning tool may further include a support member engaging the inner surface of the pipeline. The apparatus may also include an encapsulant encapsulating the anode, wherein the encapsulant includes a hydrophilic wax repellent cementitious material that is sufficiently porous to allow ions to pass therethrough. The encapsulant may include grains having a resin coating, the grains including a plurality of crystalline compounds including mullite and corundum. The encapsulant may be fluid permeable, acid resistance, and/or resistant to $H_2S$. The encapsulant may include cement and/or carbon. The encapsulant may include pores, the pores having a diameter in the range of 100 μm to 650 μm.

Another example embodiment is a method for cleaning the inner surface of a pipeline from deposits and for forming a protective coating. The method may include causing a cleaning tool to move in the interior of the pipeline by a flow of a fluid, the cleaning tool including a plurality of guide discs engaging the pipeline surface and mounted along a longitudinal axis of the cleaning tool, attaching an anode to the cleaning tool, connecting an impressed current source to the anode and the interior of the pipeline, and applying current from the current source to the anode and the interior of the pipeline, the interior of the pipeline acting as a cathode when current is applied from the current source so that ions flow from the anode, through the fluid, to the interior of the pipeline. The step of attaching may further include positioning the anode inside the cleaning tool. The method may also include installing a battery device on the cleaning tool as the impressed current source. The anode may include a material selected from a group consisting of mixed metal oxide ("MMO"), platinized niobium ("PtNb") and platinized titanium ("PtTi"). The method may further include encapsulating the anode with an encapsulant, wherein the encapsulant includes a hydrophilic wax repellent cementitious material that is sufficiently porous to allow ions to pass therethrough. The method may also include selecting an anode size to provide a predetermined amount of cathodic protection at a predetermined voltage, based on the fluid properties and conditions expected in the pipeline, the size of the pipeline, and the number of anodes to be used. The method may further include selecting a minimum thickness for an encapsulant to encapsulate the anode, and determining a minimum size of a container to be used, the minimum size having an internal dimension greater than a dimension of the anode and the thickness of the encapsulant combined. The method may further include inserting the anode into the container and filling the remaining space in the container with the encapsulant, the encapsulant being in a generally liquid, uncured state, wherein the encapsulant includes grains having a resin coating, the grains including a plurality of crystalline compounds including mullite and corundum. The method may also include curing the encapsulant to a hardened state and removing the anode and the encapsulant from the container, and positioning the anode inside the cleaning tool.

Another example embodiment is a pipeline pig for cleaning the inner surface of a pipeline from deposits and for forming a protective coating. The pipeline pig may include a plurality of guide discs mounted along a longitudinal axis of the cleaning tool and engaging the pipeline surface, an anode positioned inside the pipeline pig, and an impressed current source electrically connected to the anode and the interior of the pipeline, the interior of the pipeline acting as a cathode when current is applied from the current source so that ions flow from the anode to the interior of the pipeline.

BRIEF DESCRIPTION OF THE DRAWINGS

So that the manner in which the features, advantages and objects of the invention, as well as others which may become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only example embodiments of the invention and is therefore not to be considered limiting of its scope as the invention may admit to other equally effective embodiments.

DETAILED DESCRIPTION

The methods and systems of the present disclosure will now be described more fully hereinafter with reference to the accompanying drawings in which embodiments are shown. The methods and systems of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

Figure 1A:
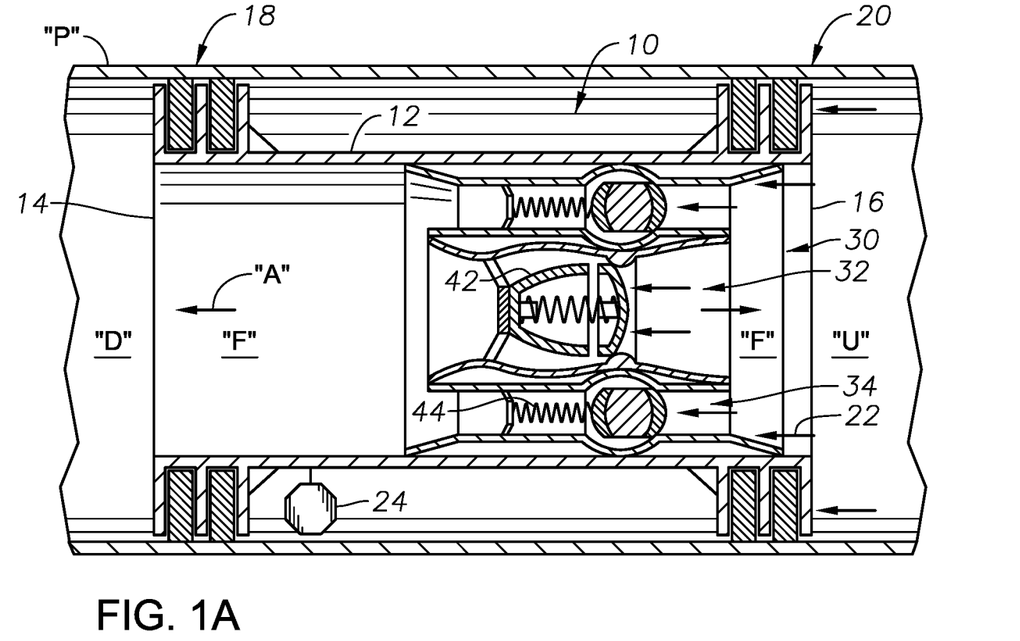
FIG. 1A is a schematic cross-sectional side view of a pipeline pig including a passive bypass valve and a plurality of passive relief valves in accordance with an example embodiment.
Figure 1B:
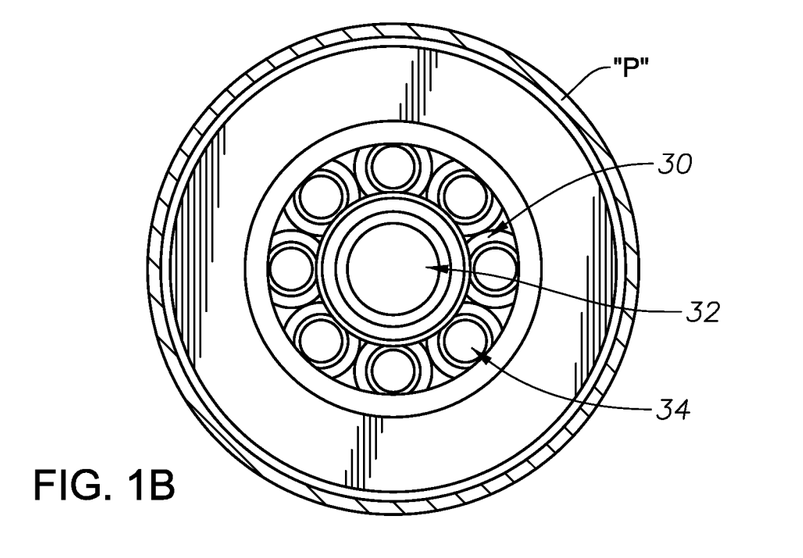
FIG. 1B is an end view of the pipeline pig of FIG. 1A.

Referring to FIGS. 1A and 1B, pipeline pig 10 is constructed in accordance with an example embodiment of the present invention, and is disposed within an interior of pipeline "P." Pipeline pig 10 includes housing 12, which defines a downstream or leading end 14, an upstream or trailing end 16 and longitudinal axis "A" extending therebetween. A pressure differential established in pipeline fluid "F" between leading end 14 and trailing end 16 propels pipeline pig 10 through the interior of pipeline "P." As used herein, unless otherwise specified, the phrase "differential pressure" designates a relatively high pressure on an upstream side (generally designated in the figures by "U" (toward trailing end 16)) of pipeline pig 10 with respect to a relatively low pressure on a downstream side (generally designated in the figures by "D" (toward leading end 14)). A plurality of bracketed front guide discs 18, and bracketed rear guide discs 20 are disposed about housing 12 at leading end 14 and trailing end 16 respectively. Bracketed front guide discs 18 and bracketed rear guide disks 20 sealingly contact a wall of pipeline "P" to scrape deposits therefrom and to guide pipeline pig 10 through pipeline "P." Pipeline pig 10 is propelled as pipeline fluid "F," as indicated by arrows 22, push pipeline pig 10. In some embodiments, pinger 24 is included within or mounted to housing 12 of pipeline pig 10. Pinger 24 is operable to provide a signal to facilitate determination of a location of pipeline pig 10 throughout deployment of pipeline pig 10 in pipeline "P."

Internal flow cavity 30 extends longitudinally through pipeline pig 10 between trailing end 16 and leading end 14 of housing 12. Internal flow cavity 30 includes bypass channel 32 extending centrally therethrough and a plurality of distinct relief channels 34 radially disposed about bypass channel 32. In the embodiment illustrated, eight (8) relief channels 34 are provided although more or fewer are provided in other embodiments. Bypass valve 42 is provided within bypass channel 32. As described in greater detail below, bypass valve 42 is operable to selectively restrict and permit flow of pipeline fluid "F" through bypass channel 32. Relief valves 44 are provided within each relief channel 34. Relief valves 44 are operable to selectively restrict and permit flow of pipeline fluid "F through respective relief channels 34. In the embodiment illustrated, bypass valve 42 and relief valves 44 are longitudinally adjacent although, in other embodiments, bypass valve 42 is disposed in an upstream position or in a downstream position with respect to relief valves 44.

Figure 2:
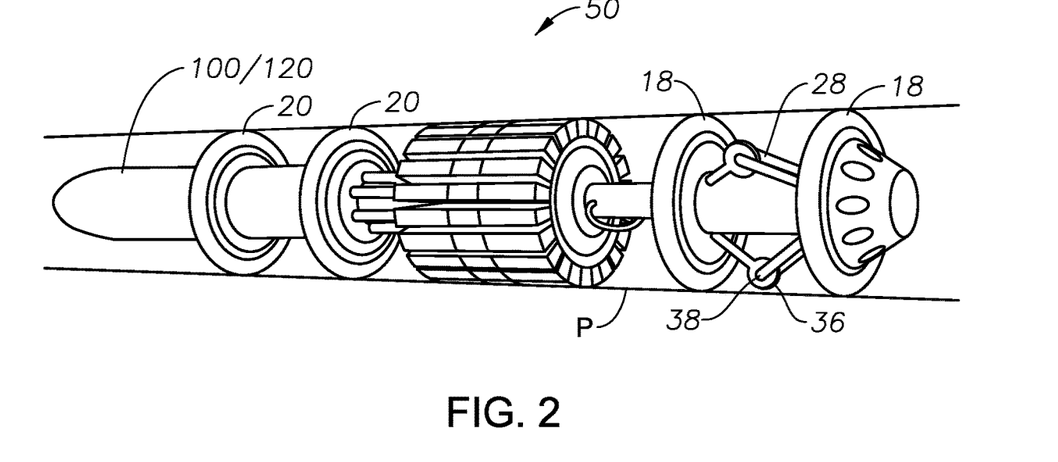
FIG. 2 is a perspective view of a pipeline pig with a cathodic protection system according to an embodiment of the invention.

FIG. 2 shows another embodiment of the pipeline pig 50, according to the present invention. In this embodiment, the pig 50 includes a plurality of front guide discs 18 and a plurality of rear guide discs 20. Support members 28 made of metal or plastic rods having impact-type alarm members provided at the ends of the rods and engaging the interior surface of the pipeline P. Each alarm member 28 comprises a roller 36. During movement of the apparatus 50 through the pipeline P, the rollers 28 run over the interior surface of the pipeline P so that the apparatus 50 may easily be located within the pipeline P. In addition, the speed of the rollers 36 may be an indicator of the speed at which the apparatus 50 moves. Each roller 36 is mounted using a pivot pin 38. The pivot pin 38 is journalled in a bracket rigidly secured to the end of the support member 28. In the illustrated embodiment, support members 28 includes actuators that may be hydraulic cylinders, although in other embodiments, pneumatic or electric actuators are contemplated.

Apparatus 50 may further include a cathodic protection ("CP") system 100, 120 that may be used to protect steel components of pipeline P from corrosion. CP systems 100 and 120 will be described in further detail in the following paragraphs with reference to FIGS. 3-5. One particular type of CP system 100 (shown in FIG. 3) is known as a galvanic anode cathodic protection ("GACP") system. In GACP systems, steel structures can be protected from corrosion ("a protected metal") by being positioned as a cathode in an electrochemical cell that includes an anode composed of a more highly reactive metal than the cathode. The anodes can be composed of, for example, highly reactive metals such as aluminum, zinc, or magnesium. The electrochemical cell includes an electrolyte (e.g., water), and the anode and the cathode are positioned in the same electrolyte to provide an ion pathway between the anode and the cathode. In the electrochemical cell, the anode and the cathode are also electrically connected to provide an electron pathway between the anode and the cathode.

Figure 3:
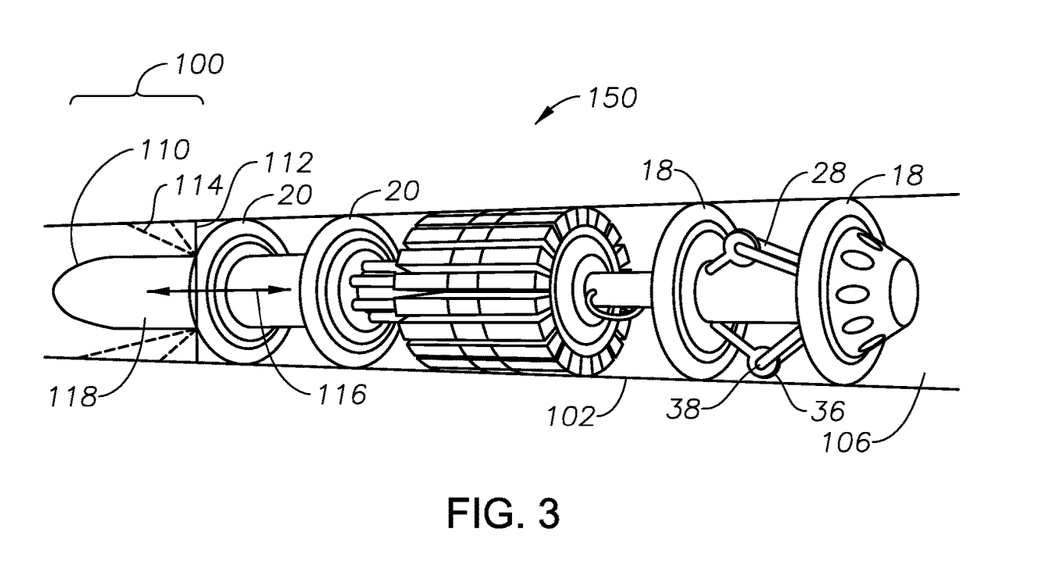
FIG. 3 is a cross-sectional view of an embodiment of a pipeline pig with a galvanic anode cathode protection system according to an embodiment of the invention.

When the protected metal, for example pipeline P, and the anode are part of the electrochemical cell accordingly, the more reactive anode corrodes in preference to the protected metal structure, thereby preventing corrosion of the protected metal. Due to the difference in the natural potentials between the anode and the protected metal, by their relative positions in the electrochemical cell, when the anode corrodes, high-energy electrons flow from the anode to the cathode through the electrical connection, thereby preventing an oxidation reaction at the protected metal structure. Thus, the anode corrodes instead of the protected metal (the cathode), until the anode material is depleted. The anode in a GACP system is known as a "sacrificial anode," and likewise, GACP systems are also known as "sacrificial anode systems."

A galvanic cathodic protection system 100 is shown in FIG. 3. System 100 includes a pipeline 102, which is a pipeline for transporting water 106 or that is otherwise in contact with water 106. In this embodiment, pipeline 102 is the protected metal as corrosion is most likely to occur in water 106. Anode assembly 110 is a galvanic anode assembly for providing corrosion protection to pipeline 102. One or more anode assemblies 110 can be mounted on the pig 150 to provide protection to the interior surfaces of pipeline 102. A large pig, for example, can have 10 anode assemblies 110, although more or fewer anode assemblies 110 can be used. Anode assembly 110 includes anode 118 mounted on and electrically connected to anode mount 112. Anode mount 112 is mechanically and/or electrically connected to the interior surface of pipeline 102 so that electric current can flow between anode mount 112 and pipeline 102. As one of skill in the art will appreciate, anode 118 has more negative electrochemical potential than pipeline 102, so that electric current flows from pipeline 102 to anode 118. Ions 114 flow from anode 118 to pipeline 102. The anode provides corrosion protection to pipeline 102. In some embodiments, test cable 116 is electrically connected to anode 118 and can be used to monitor the condition of anode 118 and determine, for example, if the anode 118 is failing.

Another type of CP system is known as an impressed-current cathodic protection ("ICCP") system. ICCP systems use anode metals connected to an external power source to provide greater current output. Impressed-current cathodic protection systems employ D/C power (e.g., rectified A/C power) to impress a current between one or more anodes and the cathode.

Figure 4A:
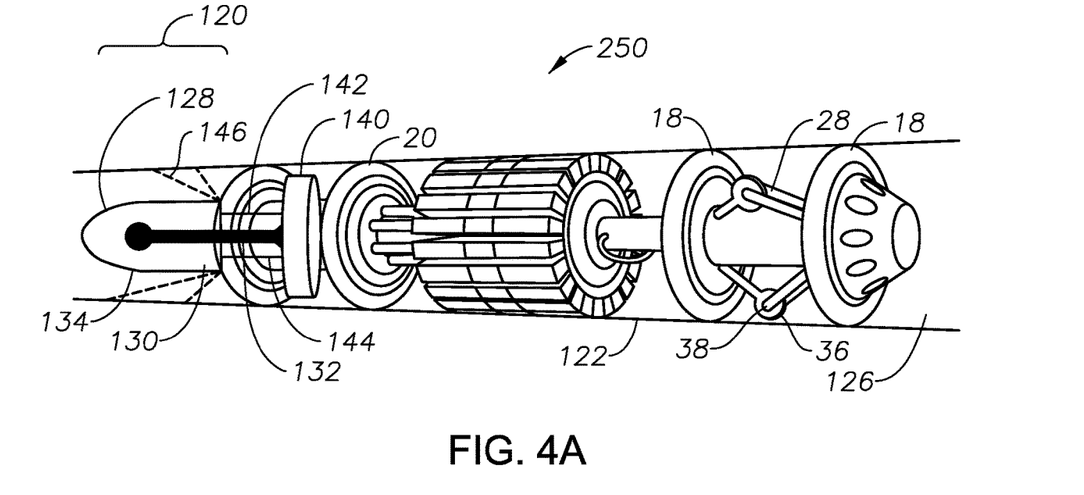
FIG. 4A is a cross-sectional view of an embodiment of a pipeline pig with an impressed current cathode protection system according to another embodiment of the invention.

An impressed current cathodic protection system 120 is shown in FIG. 4A. System 120 includes a protected metal structure to be protected from corrosion, such as pipeline 122. Pipeline 122 can be a pipeline for supplying or transporting a fluid, for example, water 126. The pace of corrosion can be high due to conditions inside pipeline 122. Anode assembly 128 is an ICCP anode assembly for providing corrosion protection to pipeline 122. One or more anode assemblies 128 are mounted on the pipeline pig 250 to protect the interior surfaces of pipeline 122. A large pig, for example, can have 10 anode assemblies 128, although more or fewer anode assemblies 128 can be used. Anode assembly 128 includes anode 130 mounted on anode mount 132. Encapsulant 134 encapsulates all or a portion of anode 130. Anode 130 is electrically isolated from pipeline 122, by, for example, using a non-conductive mount or having an insulator such as insulated spacer positioned between mount 132 and pipeline 122.

Power supply 140 is a direct current ("DC") power supply having a negative line 142 electrically connected to pipeline 122 and a positive line 144 electrically connected to anode 130. Power supply 140 can be connected to an alternating current ("AC") power source, and can include a rectifier for converting the AC electricity into DC electricity. When electric current is applied by power supply 140, electric current flows from pipeline 122 to anode 130. Ions 146 flow from anode 130 to pipeline 122, thereby depositing a layer of anode on the interior providing corrosion protection to pipeline 122.

Figure 4B:
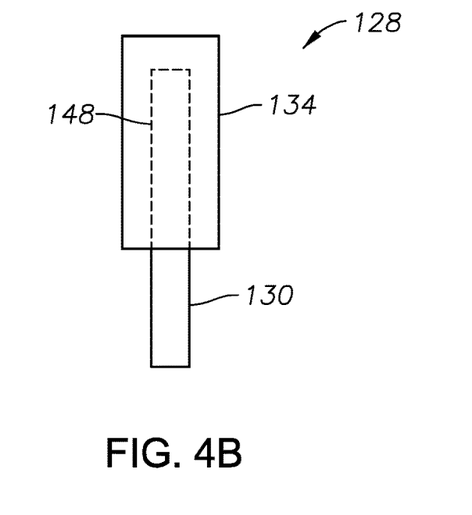
FIG. 4B is an enlarged view of the anode assembly of FIG. 4A.

Referring now to FIG. 4B, in embodiments, anode 130 is made of a dimensionally stable material such that the material is not consumed or has minimal consumption during operation. Indeed, the dimension of the exterior surface 148 of anode 130 does not change in response to corrosion. Anode 130 is made of a material that does not dimensionally change in response to corrosion, such as mixed metal oxide ("MMO"), platinized niobium ("PtNb"), or platinized titanium ("PtTi"). In some embodiment, high temperature (HTZ) zinc anodes may be used in pipelines at temperatures above 50° C. and up to 70° C.

An encapsulant 134 is used to encapsulate, or coat, anode 130. Encapsulant 134 can be applied to anode 130 in a generally liquid state. After curing to a hardened, cured state, encapsulant 134 is generally rigid. Alternatively, encapsulant 134 can be applied as a powder before being fired and cured. After being applied and when in the cured state, encapsulant 134 covers and is in contact with all or at least a portion of exterior surface 148. In embodiments, encapsulant 134 can be used with ICCP systems. In embodiments, encapsulant 134 is applied to anode 130 before anode 130 is connected to pipeline 122. In embodiments, encapsulant 134 is spaced apart from pipeline 122, meaning that it is not connected directly to and is not a part of the structure being protected, such as pipeline 122, except by way of anode 130.

Encapsulant 134 is a hydrophilic cementitious coating material that permits anode 130 to discharge a current through encapsulant 134. In embodiments, encapsulant 134 is a cementitious material that is permeable, has high mechanical strength, and has the ability to repel waxy materials. Encapsulant 134 can also protect anode 130 from erosion corrosion. In embodiments, grains of encapsulant 134 can be in the general form of spheres with a diameter in a range of 350 µm to 1,500 µm and can have, for example, a diameter of about 950 µm. The grains can have a resin coating. In embodiments, the grains can include crystalline compounds such as mullite and corundum. For example, more than 50% of the crystalline compounds can be mullite or corundum, or a combination of mullite and corundum. Lesser amounts of quartz, bayrite, and microline can also be included in the cement. In other embodiments, encapsulant 134 can comprise 40% to 60% cement and 40% to 60% carbon, and for example, can comprise 50% cement and 50% carbon and can be, for example, the SAE Inc. product known as Conducrete™.

In embodiments, encapsulant 134 can be electrically conductive. In embodiments, encapsulant 134 can be sufficiently porous to permit ions or electrons to pass therethrough. For example, the encapsulant 134 can have pores with a diameter in a range of 100 µm to 650 µm and can have, for example a diameter of about 200 µm to 250 µm. Ions 146, thus, can pass from anode 130, through encapsulant 134 and water 126 to pipeline 122.

In some embodiments, encapsulant 134 is a wax repellent material, meaning that it repels wax, such as paraffin wax, and resists wax deposition. Furthermore, wax is not able to pass through the pores of encapsulant 134 so encapsulant 134 prevents wax from adhering to and building up on anode 130. In embodiments, encapsulant 134 is acid resistant. More specifically, in embodiments, encapsulant 134 is resistant to $H_2S$. In embodiments, anode 130 is used in a conductive media, such as water, so it is not necessary for encapsulant 134 to have properties that cause it to decrease the contact resistance between anode 130 and the conductive media. In contrast, conventional anodes used in, for example, concrete may need to overcome the high resistivity of that concrete by decreasing the contact resistance in the immediate vicinity of the anode by way of encapsulating the anode in a conductive media.

In embodiments, anode 130 is dimensionally stable so that it does not change shape during operation for at least a predetermined amount of time. Therefore, the outer surface of anode 130 remains in contact with the inner surface of encapsulant 134 for at least the predetermined amount of time. If anode 130 was not dimensionally stable, it could corrode during operation resulting in gaps between the outer surface of anode 130 and the inner surface of encapsulant 134. If such gaps existed, wax could migrate into the gap and have an insulating effect on the anode. By operating for at least the predetermined amount of time without any gaps forming, encapsulant 134 prevents wax from contacting anode 130 for at least the predetermined amount of time. In embodiments, the predetermined amount of time can be between 1 and 20 years. In embodiments, the predetermined amount of time can be between 3 and 15 years. In embodiments, the predetermined amount of time can be between 5 and 10 years. In embodiments, the predetermined amount of time can be greater than 5 years. In embodiments, the predetermined amount of time can be greater than 7 years. In embodiments, the predetermined amount of time can be greater than 10 years.

Figure 5:
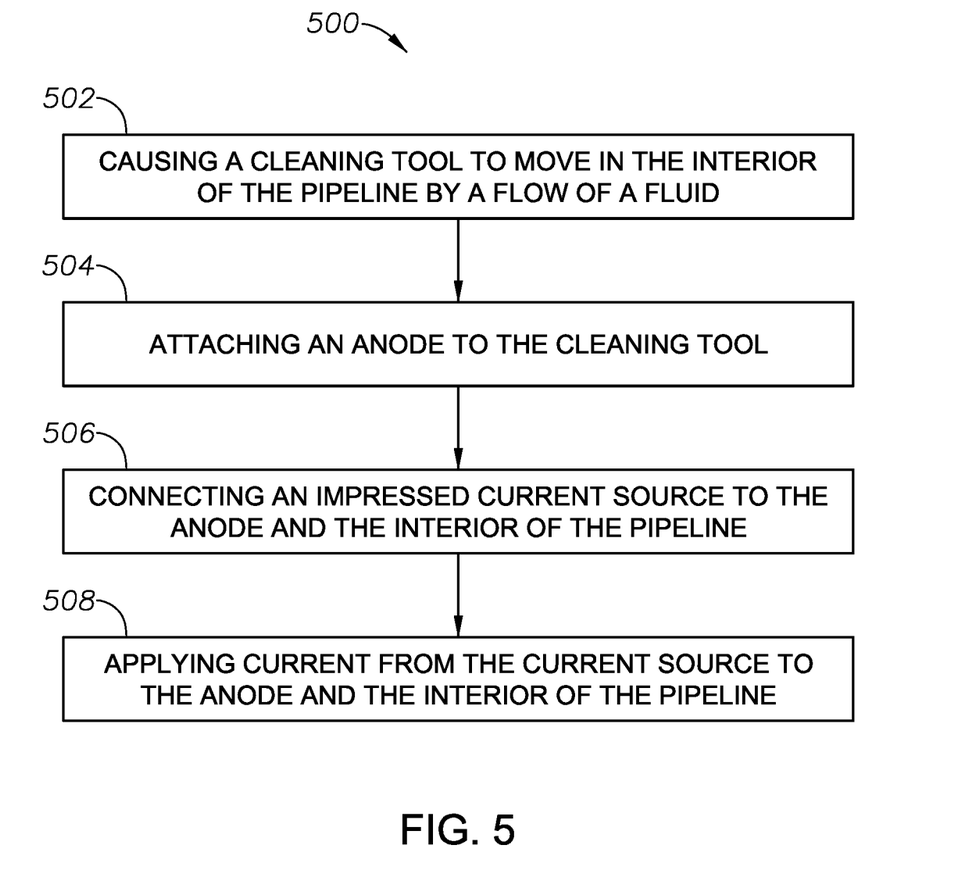
FIG. 5 illustrates example steps in a method for cleaning the inner surface of a pipeline from deposits and for forming a protective coating, according to one or more example embodiments of the disclosure.

FIG. 5 illustrates example steps in a method 500 for cleaning the inner surface of a pipeline from deposits and for forming a protective coating, according to one or more example embodiments of the disclosure. The method 500 may include, at step 502, causing a cleaning tool, such as a pipeline pig 50, 150, 250, to move in the interior of the pipeline by a flow of a fluid, the cleaning tool including a plurality of guide discs engaging the pipeline surface and mounted along a longitudinal axis of the cleaning tool. The method may further include, at step 504, attaching an anode to the cleaning tool, and connecting an impressed current source to the anode and the interior of the pipeline, in step 506. The method may further include, at step 508, applying current from the current source to the anode and the interior of the pipeline, the interior of the pipeline acting as a cathode when current is applied from the current source so that ions flow from the anode, through the fluid, to the interior of the pipeline. The step of attaching may further include positioning the anode inside the cleaning tool. The method may also include installing a battery device on the cleaning tool as the impressed current source. The anode may include a material selected from a group consisting of mixed metal oxide ("MMO"), platinized niobium ("PtNb") and platinized titanium ("PtTi").

Figure 6:
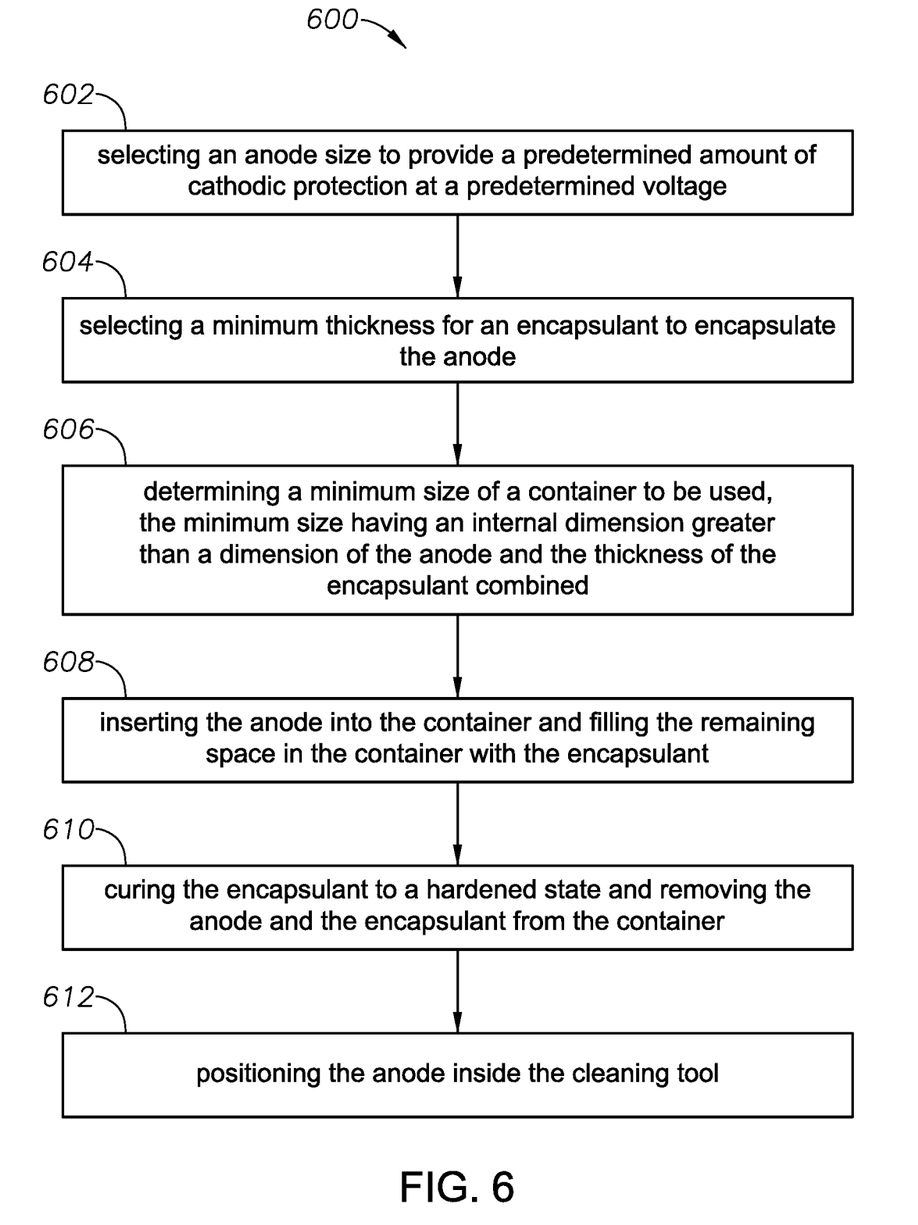
FIG. 6 illustrates example steps in a method for cleaning the inner surface of a pipeline from deposits and for forming a protective coating, according to one or more example embodiments of the disclosure.

FIG. 6 illustrates example steps in a method 600 for cleaning the inner surface of a pipeline from deposits and for forming a protective coating, according to one or more example embodiments of the disclosure. The method 600 may include encapsulating the anode with an encapsulant, wherein the encapsulant includes a hydrophilic wax repellent cementitious material that is sufficiently porous to allow ions to pass therethrough. The method may include, at step 602, selecting an anode size to provide a predetermined amount of cathodic protection at a predetermined voltage, based on the fluid properties and conditions expected in the pipeline, the size of the pipeline, and the number of anodes to be used. The method may further include, at step 604, selecting a minimum thickness for an encapsulant to encapsulate the anode, and determining, at step 606, a minimum size of a container to be used, the minimum size having an internal dimension greater than a dimension of the anode and the thickness of the encapsulant combined. The method may further include, at step 608, inserting the anode into the container and filling the remaining space in the container with the encapsulant, the encapsulant being in a generally liquid, uncured state, wherein the encapsulant includes grains having a resin coating, the grains including a plurality of crystalline compounds including mullite and corundum. The method may also include, at step 610, curing the encapsulant to a hardened state and removing the anode and the encapsulant from the container, and positioning the anode inside the cleaning tool 50, 150, 250, at step 612.

Accordingly, example embodiments described herein relate to a smart pigging tool with an impressed current system that is mounted at the back of the smart pig so that as the pig travels inside a piggable water pipeline the pig also simultaneously applies insitu cathodic protection (CP) to the internal surfaces of the pipeline. The applied cathodic protection is meant to safeguard the pipeline internal surface against corrosion by providing an evenly distributed CP polarization film that would prevent or minimize further or future corrosion. The CP system could be galvanic (sacrificial) or impressed current type. If galvanic, it would require an anode material made out of magnesium, zinc or aluminum. If impressed current, then the anode type would be mixed metal oxide (MMO), high silicon cast iron (HSCI) or platinized titanium. Specifics of the type of the CP system (galvanic or impressed current) type and size of anode to be used would be governed by the environmental specifics and duration of protection desired.

Example embodiments described herein relate to applying a temporary cathodic protection current insitu where the CP system is fixed at the back of a moving smart pig that is being pushed inside a piggable water pipeline. The intent is to utilize the opportunity of sending a pig inside a piggable water pipeline to also apply CP on the just cleaned part of the pipe that is at the back of the pig. As the pig is moving it is cleaning the inner surfaces of the pipe from any loose corrosion products, scale, mil, debris, mud, sand, chemicals or the like so that cathodic protection will be applied on a fresh newly cleaned surface. The level of cleaning can be controlled by the type, density and roughness of the brushes mounted on the pig. The higher quality cleaning is achieved the higher the quality CP polarization film developed on the cleaned surface is developed. The better CP polarization film is developed the longer it will stay. The longer the polarization stays the slower corrosion re-instating. Ideal case is to clean, apply CP, develop CP polarization film that will not get damaged due to the agitation effect of the fluid moving inside the pipe. However, if the CP polarization film is damaged, then it could be restored by running another CP pigging. There are a number of factors that could govern the frequency of CP pigging. Factors include the pipe length and diameter, age, temperature, water cleanliness level, whether or not pipe is internally coated, flow rate, pig speed, amount of sand collecting inside the pipe, pipeline movement, pipeline roundedness, pipeline profile, etc. The CP system could be mounted on an off-the-shelf smart pig. In order to a form a strong coating during cleaning of the pipeline, the apparatus is provided with a means for creating an electric field in the zone of formation of the coating. For that purpose, the cleaning tool may be provided with any appropriate known source of electric current such as a generator or storage battery.

Specification, which includes the Summary, Brief Description of the Drawings and the Detailed Description, and the appended Claims refer to particular features (including process or method steps) of the disclosure. Those of skill in the art understand that the invention includes all possible combinations and uses of particular features described in the Specification. Those of skill in the art understand that the disclosure is not limited to or by the description of embodiments given in the Specification.

Those of skill in the art also understand that the terminology used for describing particular embodiments does not limit the scope or breadth of the disclosure. In interpreting the Specification and appended Claims, all terms should be interpreted in the broadest possible manner consistent with the context of each term. All technical and scientific terms used in the Specification and appended Claims have the same meaning as commonly understood by one of ordinary skill in the art to which this invention belongs unless defined otherwise.

As used in the Specification and appended Claims, the singular forms "a," "an," and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced. The verb "operatively connecting" and its conjugated forms means to complete any type of required junction, including electrical, mechanical or fluid, to form a connection between two or more previously non-joined objects. If a first component is operatively connected to a second component, the connection can occur either directly or through a common connector. "Optionally" and its various forms means that the subsequently described event or circumstance may or may not occur. The description includes instances where the event or circumstance occurs and instances where it does not occur.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

The systems and methods described herein, therefore, are well adapted to carry out the objects and attain the ends and advantages mentioned, as well as others inherent therein. While example embodiments of the system and method has been given for purposes of disclosure, numerous changes exist in the details of procedures for accomplishing the desired results. These and other similar modifications may readily suggest themselves to those skilled in the art, and are intended to be encompassed within the spirit of the system and method disclosed herein and the scope of the appended claims.

The invention claimed is:

1. A system for cleaning the inner surface of a pipeline from deposits and for forming a protective coating, the system comprising:
   the pipeline;
   a cleaning tool which is caused to move in the interior of the pipeline by a flow of a fluid, the cleaning tool comprising a plurality of guide discs engaging the pipeline surface and mounted along a longitudinal axis of the cleaning tool;
   an anode positioned inside the cleaning tool;
   an impressed current source electrically connected to the anode and the interior of the pipeline, the interior of the pipeline acting as a cathode when current is applied from the current source so that ions flow from the anode, through the fluid, to the interior of the pipeline; and
   an encapsulant encapsulating the anode, wherein the encapsulant comprises a hydrophilic wax repellant cementitious material that is sufficiently porous to allow ions to pass therethrough.

2. The system according to claim 1, wherein the impressed current source comprises a battery mounted on the cleaning tool.

3. The system according to claim 1, wherein the anode comprises a material selected from a group consisting of mixed metal oxide ("MMO"), platinized niobium ("PtNb") and platinized titanium ("PtTi").

4. The system according to claim 1, wherein the cleaning tool is a pipeline pig.

5. The system according to claim 1, wherein the cleaning tool further comprises a support member engaging the inner surface of the pipeline.

6. The system according to claim 1, wherein the encapsulant comprises grains having a resin coating, the grains comprising a plurality of crystalline compounds including mullite and corundum.

7. The system according to claim 1, wherein the encapsulant is fluid permeable, acid resistance, and/or resistant to $H_2S$.

8. The system according to claim 1, wherein the encapsulant comprises cement and carbon.

9. The system according to claim 1, wherein the encapsulant comprises pores, the pores having a diameter in the range of 100 μm to 650 μm.

* * * * *